United States Patent
Lee et al.

(10) Patent No.: US 9,807,389 B2
(45) Date of Patent: Oct. 31, 2017

(54) METHOD AND APPARATUS FOR IMPROVING VISUAL QUALITY BY USING NEIGHBORING PIXEL INFORMATION IN FLATNESS CHECK AND/OR APPLYING SMOOTH FUNCTION TO QUANTIZATION PARAMETERS/PIXEL VALUES

(71) Applicant: MEDIATEK INC., Hsin-Chu (TW)

(72) Inventors: Kun-Bin Lee, Taipei (TW); Tung-Hsing Wu, Chiayi (TW); Han-Liang Chou, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 2 days.

(21) Appl. No.: 14/646,020

(22) PCT Filed: Oct. 24, 2014

(86) PCT No.: PCT/CN2014/089488
§ 371 (c)(1),
(2) Date: May 20, 2015

(87) PCT Pub. No.: WO2015/058722
PCT Pub. Date: Apr. 30, 2015

(65) Prior Publication Data
US 2015/0304674 A1    Oct. 22, 2015

Related U.S. Application Data

(60) Provisional application No. 61/895,454, filed on Oct. 25, 2013, provisional application No. 61/895,461, (Continued)

(51) Int. Cl.
*G06K 9/36* (2006.01)
*H04N 19/115* (2014.01)
(Continued)

(52) U.S. Cl.
CPC ......... *H04N 19/115* (2014.11); *H04N 19/172* (2014.11); *H04N 19/174* (2014.11);
(Continued)

(58) Field of Classification Search
CPC .... H04N 19/86; H04N 19/117; H04N 19/176; H04N 19/80; H04N 19/174;
(Continued)

(56) References Cited

U.S. PATENT DOCUMENTS 6,724,944 B1 *    4/2004 Kalevo ............... H04N 19/176
                                                        375/240.29
2003/0044080 A1*  3/2003 Frishman .................. G06T 5/20
                                                        382/268
(Continued)

FOREIGN PATENT DOCUMENTS

CN    101321277 A    12/2008
CN    101453651 A    6/2009
(Continued)

OTHER PUBLICATIONS

"International Search Report" dated Jan. 28, 2015 for International application No. PCT/CN2014/089488, International filing date: Oct. 24, 2014.

*Primary Examiner* — Li Liu
(74) *Attorney, Agent, or Firm* — Winston Hsu

(57) ABSTRACT

An image processing method includes at least following steps: partitioning a picture into a plurality of picture regions, wherein each picture region comprises at least one pixel group row, each pixel group row comprises at least one pixel group, and the picture regions comprise a first picture region and a second picture region horizontally adjacent to each other; and performing flatness check upon a specific
(Continued)

pixel group in a pixel group row of the first picture region through using at least one pixel borrowed from the second picture region.

21 Claims, 13 Drawing Sheets

Related U.S. Application Data filed on Oct. 25, 2013, provisional application No. 61/904,490, filed on Nov. 15, 2013.

(51) Int. Cl.

| | | |
|---|---|---|
| H04N 19/174 | (2014.01) | |
| H04N 21/41 | (2011.01) | |
| H04N 21/43 | (2011.01) | |
| H04N 19/172 | (2014.01) | |
| H04N 19/463 | (2014.01) | |
| H04N 19/184 | (2014.01) | |
| H04N 19/436 | (2014.01) | |
| H04N 19/44 | (2014.01) | |
| H04N 19/46 | (2014.01) | |
| H04N 5/08 | (2006.01) | |

(52) U.S. Cl.
CPC ......... *H04N 19/184* (2014.11); *H04N 19/436* (2014.11); *H04N 19/44* (2014.11); *H04N 19/46* (2014.11); *H04N 19/463* (2014.11); *H04N 21/4122* (2013.01); *H04N 21/4302* (2013.01); *H04N 5/08* (2013.01)

(58) Field of Classification Search
CPC ........ H04N 19/436; G06T 2207/20012; G06T 2207/20021; G06T 5/002
See application file for complete search history.

(56) References Cited

U.S. PATENT DOCUMENTS

| | | | | |
|---|---|---|---|---|
| 2004/0076237 | A1* | 4/2004 | Kadono | H04N 19/105 375/240.29 |
| 2005/0100237 | A1* | 5/2005 | Kong | G06T 7/0081 382/261 |
| 2006/0013315 | A1* | 1/2006 | Song | H04N 19/176 375/240.24 |
| 2007/0140574 | A1* | 6/2007 | Yamaguchi | H04N 19/176 382/233 |
| 2008/0152020 | A1 | 6/2008 | Kayashima | |
| 2009/0279808 | A1* | 11/2009 | Shiraishi | G06T 5/002 382/275 |
| 2011/0235921 | A1 | 9/2011 | Springer | |
| 2011/0243464 | A1* | 10/2011 | Chida | H04N 19/85 382/232 |
| 2012/0039389 | A1* | 2/2012 | Sjoberg | H04N 19/105 375/240.03 |
| 2013/0251050 | A1* | 9/2013 | Ikeda | H04N 19/00909 375/240.29 |
| 2013/0322548 | A1* | 12/2013 | Narroschke | H04N 19/0089 375/240.24 |
| 2014/0233659 | A1* | 8/2014 | Narroschke | H04N 19/46 375/240.29 |
| 2014/0341281 | A1* | 11/2014 | Bossen | H04N 19/159 375/240.12 |
| 2014/0348250 | A1* | 11/2014 | Cho | H04N 19/423 375/240.29 |

FOREIGN PATENT DOCUMENTS

| | | |
|---|---|---|
| CN | 103299632 A | 9/2013 |
| EP | 2 285 112 A1 | 2/2011 |
| JP | 200337737 A | 2/2003 |
| WO | 2013064654 A1 | 5/2013 |

\* cited by examiner

METHOD AND APPARATUS FOR IMPROVING VISUAL QUALITY BY USING NEIGHBORING PIXEL INFORMATION IN FLATNESS CHECK AND/OR APPLYING SMOOTH FUNCTION TO QUANTIZATION PARAMETERS/PIXEL VALUES

CROSS REFERENCE TO RELATED APPLICATIONS

This application claims the benefit of U.S. provisional application No. 61/904,490 (filed on Nov. 15, 2013), U.S. provisional application No. 61/895,454 (filed on Oct. 25, 2013), and U.S. provisional application No. 61/895,461 (filed on Oct. 25, 2013). The entire contents of the related applications are incorporated herein by reference.

TECHNICAL FIELD

The disclosed embodiments of the present invention relate to image processing, and more particularly, to a method and apparatus for improving the visual quality by performing flatness check through using pixels borrowed from a neighboring picture region and/or controlling quantization parameters/pixel values involved in encoding adjacent pixel groups on opposite sides of a boundary of adjacent picture regions.

BACKGROUND

A display interface may be disposed between an application processor (AP) and a display driver integrated circuit (DDIC) to transmit display data from the AP to the DDIC for further processing. When a display panel supports a higher display resolution, 2D/3D display with higher resolution can be realized. Hence, the display data transmitted over the display interface would have a larger data size/data rate, which increases the power consumption of the display interface inevitably. If the AP and the DDIC are both located at a portable device (e.g., a smartphone) powered by a battery device, the battery life is shortened due to the increased power consumption of the display interface.

Similarly, a camera interface may be disposed between a camera module and an image signal processor (ISP) to transmit multimedia data from the camera module to the ISP for further processing. The ISP may be part of an application processor. When a camera sensor with a higher resolution is employed in the camera module, the captured image data transmitted over the camera interface would have a larger data size/data rate, which increases the power consumption of the camera interface inevitably. If the camera module and the ISP are both located at a portable device (e.g., a smartphone) powered by a battery device, the battery life is shortened due to the increased power consumption of the camera interface.

Data compression may be employed to reduce the data size/data rate of picture data transmitted over a transmission interface such as the display interface or the camera interface. To enable parallel processing in an encoder side, a decoder side, or both, partitioning one picture into multiple picture regions (e.g., slices or tiles/panes) is proposed. However, concerning a single-port compressed data transmission application, it is possible that a slice width is not evenly divisible by a pixel group width. Similarly, concerning a multi-port compressed data transmission application, it is possible that a tile/pane width is not evenly divisible by a pixel group width. A typical encoder design may employ pixel padding to obtain needed pixels. For example, one existing pixel may be replicated to create one or more padding pixels. However, the slice boundary condition may make the processing more complicated, and such a pixel padding operation does not consider the visual quality. Further, adjacent picture regions are encoded independently. The visual quality of a boundary between the adjacent picture regions may be degraded due to significant discrepancy between quantization parameters assigned to pixel groups on opposite sides of the boundary.

SUMMARY

In accordance with exemplary embodiments of the present invention, a method and apparatus for improving the visual quality by performing flatness check through using pixels borrowed from a neighboring picture region and/or controlling quantization parameters/pixel values involved in encoding adjacent pixel groups on opposite sides of a boundary of adjacent picture regions are proposed.

According to a first aspect of the present invention, an exemplary image processing method is disclosed. The exemplary image processing method includes: partitioning a picture into a plurality of picture regions, wherein each picture region comprises at least one pixel group row, each pixel group row comprises at least one pixel group, and the picture regions comprise a first picture region and a second picture region horizontally adjacent to each other; and performing flatness check upon a specific pixel group in a pixel group row of the first picture region through using at least one pixel borrowed from the second picture region.

According to a second aspect of the present invention, an exemplary image processing method is disclosed. The exemplary image processing method includes: partitioning a picture into a plurality of picture regions, wherein each picture region comprises at least one pixel group row, and each pixel group row comprises at least one pixel group; performing flatness check upon a last pixel group in a pixel group row of a picture region through using at least one first pixel beyond a right edge of the pixel group row; and encoding the last pixel group in the pixel group row of the picture region through using at least one second pixel beyond the right edge of the pixel group row. The right edge of the pixel group row is not a right edge of the picture, and a source of the at least one first pixel is different from a source of the at least one second pixel.

According to a third aspect of the present invention, an exemplary image processing method is disclosed. The exemplary image processing method includes: partitioning a picture into a plurality of picture regions, wherein each picture region comprises a plurality of pixel groups, the picture regions comprise a first picture region and a second picture region, and a first pixel group of the first picture region and a second pixel group of the second picture region are adjacent to each other and located on opposite sides of a boundary between the first picture region and the second picture region; and controlling a first data set involved in encoding the first pixel group and a second data set involved in encoding the second pixel group to ensure that at least one predefined criterion is met.

According to a fourth aspect of the present invention, an image processing apparatus is disclosed. The image processing apparatus includes a partition determination circuit and a flatness determination circuit. The partition determination circuit is configured to partition a picture into a plurality of picture regions, wherein each picture region comprises at least one pixel group row, each pixel group row comprises at least one pixel group, and the picture regions comprise a first picture region and a second picture region horizontally adjacent to each other. The flatness determination circuit is configured to perform flatness check upon a specific pixel group in a pixel group row of the first picture region through using at least one pixel borrowed from the second picture region.

According to a fifth aspect of the present invention, an exemplary image processing apparatus is disclosed. The exemplary image processing apparatus includes a partition determination circuit, a flatness determination circuit, and an encoding circuit. The partition determination circuit is configured to partition a picture into a plurality of picture regions, wherein each picture region comprises at least one pixel group row, and each pixel group row comprises at least one pixel group. The flatness determination circuit is configured to perform flatness check upon a last pixel group in a pixel group row of a picture region through using at least one first pixel beyond a right edge of the pixel group row. The encoding circuit is configured to encode the last pixel group in the pixel group row of the picture region through using at least one second pixel beyond the right edge of the pixel group row. The right edge of the pixel group row is not a right edge of the picture, and a source of the at least one first pixel is different from a source of the at least one second pixel.

According to a sixth aspect of the present invention, an exemplary image processing apparatus is disclosed. The exemplary image processing apparatus includes a partition determination circuit and a visual quality enhancement circuit. The partition determination circuit is configured to partition a picture into a plurality of picture regions, wherein each picture region comprises a plurality of pixel groups, the picture regions comprise a first picture region and a second picture region, and a first pixel group of the first picture region and a second pixel group of the second picture region are adjacent to each other and located on opposite sides of a boundary between the first picture region and the second picture region. The visual quality enhancement circuit is configured to control a first data set involved in encoding the first pixel group and a second data set involved in encoding the second pixel group to ensure that at least one predefined criterion is met.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes applying data compression to a picture and then transmitting a compressed picture over a transmission interface. As the data size/data rate of the compressed picture is smaller than that of the original un-compressed picture, the power consumption of the transmission interface is reduced correspondingly. With regard to the data compression, the present invention proposes performing flatness check through using pixels borrowed from a neighboring picture region. In this way, the flatness check result is more accurate, thus improving the visual quality of the boundary between adjacent picture regions. In addition, the present invention also proposes using a smooth function to control quantization parameters/pixel values involved in encoding adjacent pixel groups on opposite sides of the boundary of adjacent picture regions. The distortion issue may be mitigated or avoided, thus improving the visual quality of the boundary between adjacent picture regions. By way of example, but not limitation, the proposed flatness check and/or the proposed smooth function may be employed by a coding standard, such as a Video Electronics Standards Association (VESA) display stream compression (DSC), to achieve better visual quality. Further details of the proposed flatness check and smooth function will be described as below.

Figure 1:
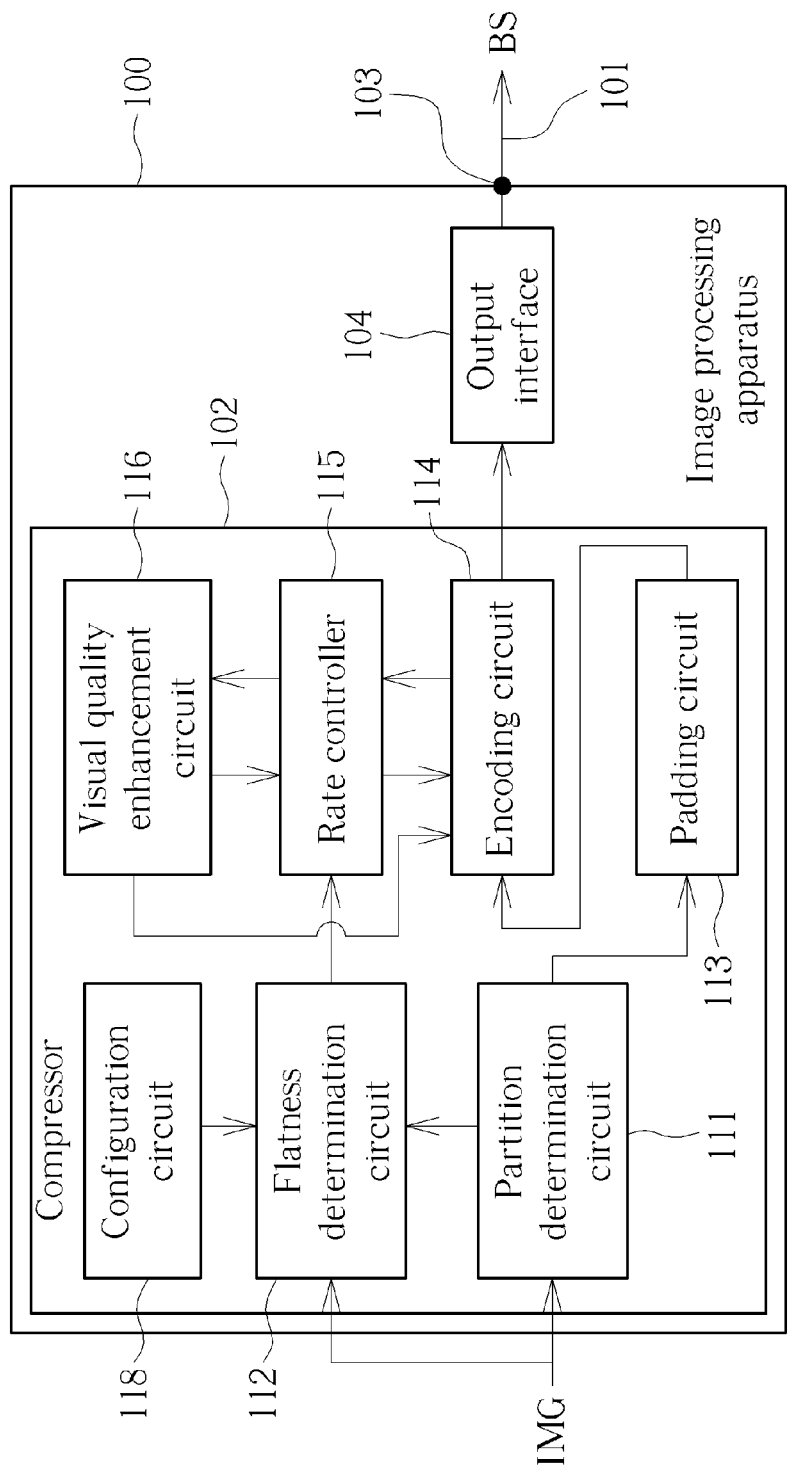
FIG. 1 is a diagram illustrating an image processing apparatus according to an embodiment of the present invention.

FIG. 1 is a diagram illustrating an image processing apparatus according to an embodiment of the present invention. The image processing apparatus 100 includes a compressor 102 and an output interface 104. The compressor 102 may include a partition determination circuit 111, a flatness determination circuit 112, a padding circuit 113, an encoding circuit 114, a rate controller 115, a visual quality enhancement circuit 116, and a configuration circuit 118. It should be noted that only the circuit components pertinent to the present invention are shown in FIG. 1. In practice, the image processing apparatus 100 may be configured to have additional circuit components.

The compressor 102 is configured to compress (i.e., encode) a picture IMG to generate a compressed picture. The output interface 104 is coupled between the compressor 102 and a transmission interface 101, and configured to transit the compressed picture (i.e., encoded data of the picture IMG) as a bitstream BS over the transmission interface 101. Specifically, the image processing apparatus 100 is located in an encoder side, and generates the bitstream BS to a decoder side through a single transmission port 103 of the transmission interface 101.

In one exemplary implementation, the image processing apparatus 100 may be implemented in a camera module, and may transmit the bitstream BS to an image signal processor (ISP). The ISP may be part of an application processor (AP). Hence, the picture IMG to be processed by the proposed image processing apparatus 100 may be derived from an output of a camera sensor in the camera module. In addition, the transmission interface 101 may be a camera serial interface (CSI) standardized by a Mobile Industry Processor Interface (MIPI), and the transmission port 103 may be a camera port of the CSI.

In another exemplary implementation, the image processing apparatus 100 may be implemented in an AP, and may transmit the bitstream BS to a display driver integrated circuit (DDIC). Hence, the picture IMG to be processed by the proposed image processing apparatus 100 may be generated in the AP. In addition, the transmission interface 101 may be a display serial interface (DSI) standardized by a Mobile Industry Processor Interface (MIPI), and the transmission port 103 may be a display port of the DSI.

The partition determination circuit 111 is configured to partition the picture IMG into a plurality of picture regions. In this embodiment, a single-port compressed data transmission is employed by the image processing apparatus 100. Hence, each of the picture regions determined by the partition determination circuit 11 is a slice. After partitioning is applied to the picture IMG, the picture IMG may be regarded as having slice rows arranged vertically. In the present invention, each slice row is a combination of multiple slices arranged horizontally. Hence, the picture IMG has at least one slice boundary between horizontally adjacent slices.

For example, the partitioning setting determined by the partition determination circuit 111 may be referenced by the flatness determination circuit 112 for choosing correct pixels to undergo the flatness check. However, this is not meant to be a limitation of the present invention. For another example, the configuration circuit 118 is configured to store configuration information. Hence, the flatness determination circuit 112 may refer to the configuration information given by the configuration circuit 118 for choosing correct pixels to undergo the flatness check. This also falls within the scope of the present invention.

Figure 2:
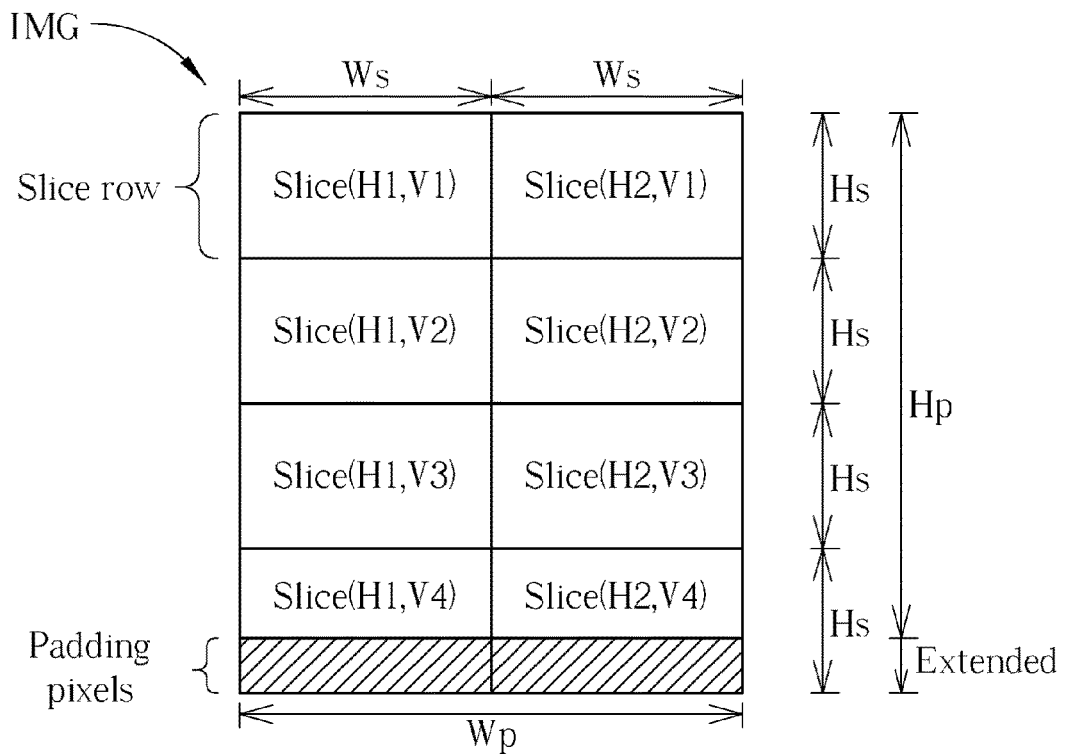
FIG. 2 is a diagram illustrating a slice-based partitioning setting of a picture according to an embodiment of the present invention.

FIG. 2 is a diagram illustrating a slice-based partitioning setting of the picture IMG according to an embodiment of the present invention. By way of example, but not limitation, the partitioning setting may be determined by the partition determination circuit 111. In this example, the picture IMG is partitioned into eight slices including Slice(H1, V1), Slice(H1, V2), Slice(H1, V3), Slice(H1, V4) arranged vertically and Slice(H2, V1), Slice(H2, V2), Slice(H2, V3), Slice(H2, V4) arranged vertically. All of the slices have the same slice size. Specifically, each of the slices has the same slice width $W_S$ and the same slice height $H_S$. It is possible that the original picture height Hp of the picture IMG is not evenly divisible by the slice height $H_S$. The padding circuit 113 may add padding pixels below the last line (i.e., the last pixel row) of the picture IMG to serve as part of the slices Slice(H1, V4) and Slice(H2, V4). In this way, each of the slices has the same slice height $H_S$. A pseudo picture region not belonging to the original picture IMG may be created to facilitate the data compression. In this embodiment, padding pixels added below the last line (i.e., the last pixel row) of the picture IMG to make the lasts slice row have the desired slice height $H_S$ may form one pseudo picture region. After the pseudo picture region is added due to pixel padding, the picture height Hp is extended to cover this pseudo picture region. Further, it is also possible that the slice width $W_S$ is not evenly divisible by a pixel group width. The padding circuit 113 may also add padding pixels beyond a right edge of a slice. Since the encoding circuit 114 employs a pixel group based lossy compression scheme, these padding pixels added by the padding circuit 113 are needed by the encoding circuit 114 for successfully encoding the slices.

All of the slices in the picture IMG have the same slice size defined by the slice height $H_S$ and the slice width $W_S$. Hence, the picture IMG is partitioned into a plurality of slice rows according to the slice height $H_S$. Each of the slice rows is divided into a plurality of slices according to the slice width $W_S$, where the slices are arranged horizontally in the same slice row. Based on a group size (i.e., a size of a pixel group composed of multiple pixels), each slice is divided into a plurality of pixel groups, each acting as a basic compression unit (i.e., a basic coding unit) processed by the encoding circuit 114. For example, each pixel group may be an m×n pixel block, where m represents a pixel group height, n represents a pixel group width, and m and n are positive integers. When m=1, each pixel group is a one-dimensional pixel block. When m>1, each pixel group is a two-dimensional pixel block.

Figure 3:
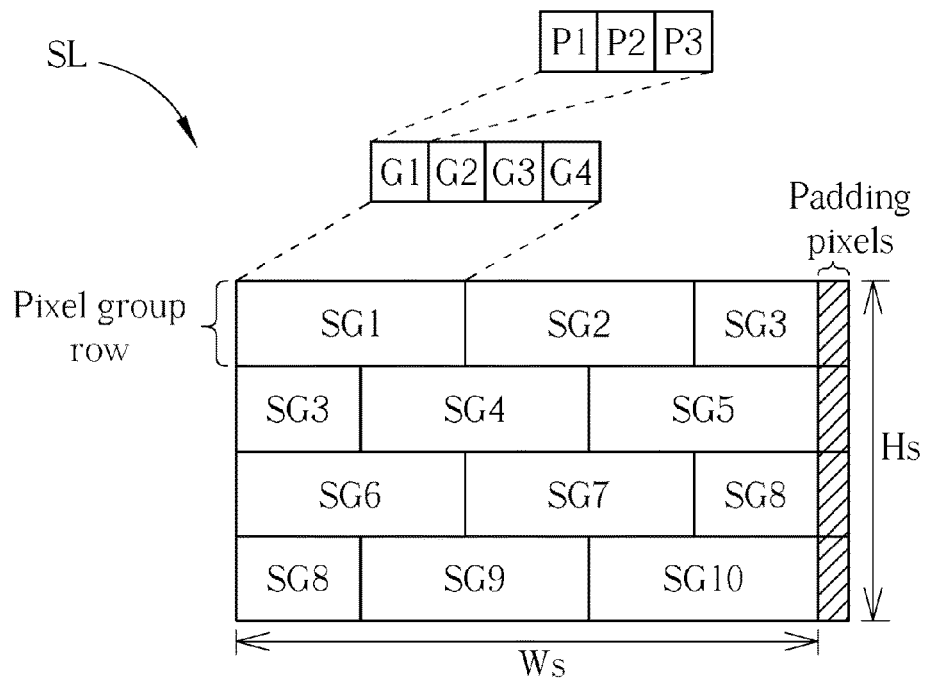
FIG. 3 is a diagram illustrating a partition setting of a slice in the picture according to an embodiment of the present invention.

FIG. 3 is a diagram illustrating a partition setting of a slice SL in the picture IMG according to an embodiment of the present invention. For example, the slice SL may be one of the slices Slice(H1, V1)-Slice(H1, V4) and Slice(H2, V1)-Slice(H2, V4). Each slice may include at least one pixel group row, and each pixel group row may include at least one pixel group. In this example, the slice SL has four pixel group rows, where each pixel group row is defined to have a plurality of pixel groups, and each pixel group is defined to include three pixels. For example, the pixel group G1 has pixels P1-P3. It should be noted that multiple pixel groups may be regarded as one supergroup. As shown in FIG. 3, there are ten supergroups SG1-SG10 in the slice SL, where each supergroup has four pixel groups. For example, the supergroup SG1 has pixel groups G1-G4. A supergroup that includes pixel group(s) of one pixel group row may wrap around to include pixel group(s) in the next pixel group row, such as SG3 and SG8.

It is possible that the slice width $W_S$ is not evenly divisible by the pixel group width (e.g., a group size of a one-dimensional group of pixels). Hence, pixel padding is needed at a right edge of each slice. For example, when the slice SL is one of the slices Slice(H2, V1)-Slice(H2, V4), the right edge of the slice SL is also a right edge of the picture IMG. The rightmost pixel in each line (i.e., pixel row) of the picture IMG is repeated, resulting in padding pixels appended to rightmost slices in slice rows. That is, the source of the padding pixels beyond the right edge of each rightmost slice is the last pixel groups in pixel group rows of the rightmost slice. For another example, when the slice SL is one of the slices Slice(H1, V1)-Slice(H1, V4), the right edge of the slice SL is not a right edge of the picture IMG, and the methods of setting the padding pixels beyond the right edge of the slice SL depend on coding modes of last pixel groups in pixel group rows of the slice SL. Specifically, concerning each line (i.e., pixel row) of the slice SL, one or more padding pixels may be added to the right of the rightmost pixel based at least partly on a coding mode (e.g., P-mode or ICH-mode) of a pixel group to which the rightmost pixel belongs. If the last pixel group is coded in ICH-mode, the index used for the rightmost pixel shall be duplicated to pad the entropy coding unit to have 3 indices. If the last pixel group is coded in P-mode, any residuals that correspond with pixels beyond the right edge of the slice shall be set to zero.

It should be noted that the padding pixels shown in FIG. 2 and FIG. 3 are used by encoding operations (e.g., predictive mode of coding (P-mode) or indexed color history (ICH) coding) performed by the encoding circuit 114. In this embodiment, when needed pixels are not available in a pixel group row of a slice, the proposed flatness determination circuit 112 does not necessarily use padding pixels to do the flatness check. For example, under certain slice boundary conditions, the proposed flatness determination circuit 112 is allowed to perform flatness check through using pixels borrowed from a neighboring slice. Therefore, the source of pixels beyond a right edge of a pixel group line in a current slice and processed by one flatness check is different from the source of pixels beyond the right edge of the pixel group line in the current slice and processed by one encoding operation (i.e., one coding tool).

As mentioned above, a set of four consecutive pixel groups (e.g., four 1×3 pixel groups) is referred to as a supergroup. Before the encoding circuit 114 encodes a supergroup, the flatness determination circuit 112 performs flatness check on each pixel group in the supergroup to determine whether any pixel groups are "very flat" or "somewhat flat". Specifically, the flatness check can be done independently for each pixel group within a supergroup, and includes a determination of the flatness type (either "somewhat flat" or "very flat") for each pixel group. Hence, for a given supergroup, the flatness determination circuit 112 outputs four flatness indications (one for each pixel group within the supergroup) to the rate controller 115, where each flatness indication may indicate either "not flat", "somewhat flat", or "very flat". The rate controller 115 is configured to apply bit rate control to each compression operation to ensure that encoded data of a slice satisfies a bit budget allocated to the slice. For example, the rate controller 115 determines a bit budget allocated to a slice, and adaptively adjusts a quantization parameter (QP) used by the encoding circuit 114 for encoding a pixel group in the slice. The rate controller 115 may refer to a flatness signal of a pixel group to determine whether to make a QP adjustment. The encoding circuit 114 may employ lossy compression to compress a pixel group based on a QP value. Since the flatness determination result generated by the flatness determination circuit 112 can affect the QP value used for encoding the pixel group, the flatness check therefore affects the visual quality of the pixel group when the compressed pixel group is decompressed and then displayed. To improve the visual quality on a slice boundary, the proposed flatness determination circuit 112 does not use padding pixels added beyond the right edge of the slice (i.e., pixels derived from replicating rightmost/last pixels in pixel group rows of the slice). Further details of the proposed flatness check design are given as below.

Figure 4:
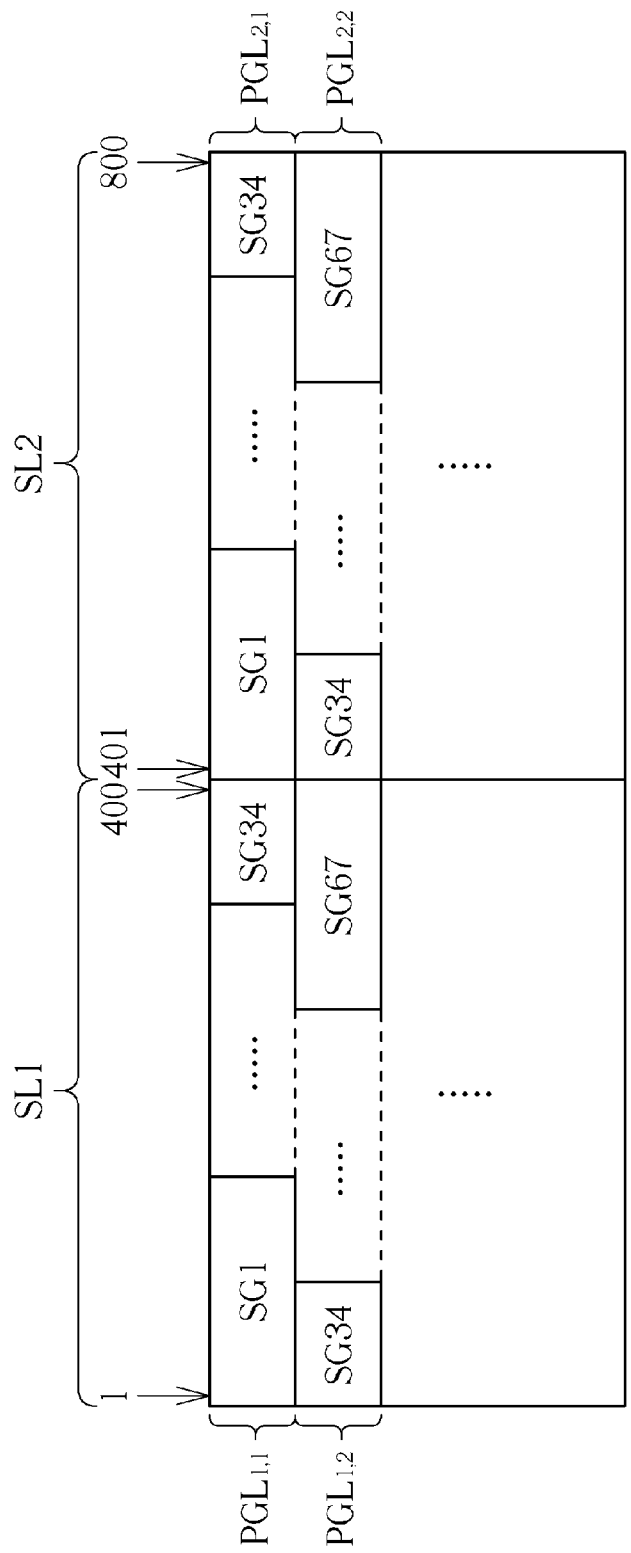
FIG. 4 is a diagram illustrating two slices each having a slice width not evenly divisible by a pixel group width.
Figure 5:
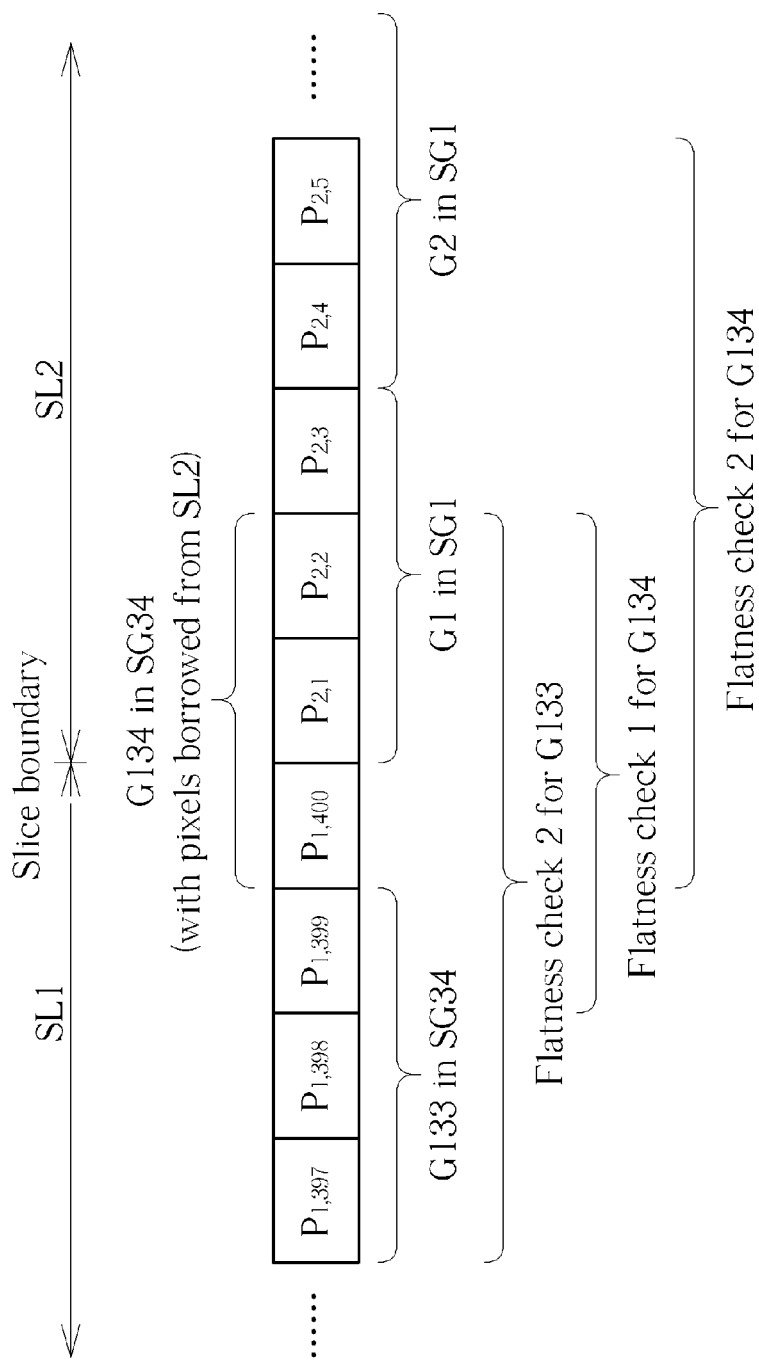
FIG. 5 is a diagram illustrating the proposed flatness check performed upon pixel groups near a slice boundary between two slices shown in FIG. 4.

Please refer to FIG. 4 in conjunction with FIG. 5. FIG. 4 is a diagram illustrating two slices each having a slice width not evenly divisible by a pixel group width. FIG. 5 is a diagram illustrating the proposed flatness check performed upon pixel groups near a slice boundary between two slices shown in FIG. 4. In this embodiment, the slices determined by the partition determination circuit 111 include a first slice SL1 and a second slice SL2 horizontally adjacent to each other. In other words, the first slice SL1 and the second slice SL2 belong to the same slice row. Assume that a slice width is 400, and a pixel group is a one-dimensional pixel group with 3 pixels (i.e., m=1 and n=3). Since each supergroup is defined to have four pixel groups, the rightmost/last supergroup in a pixel group row may wrap around to include pixel groups in the next pixel group row. As can be seen from FIG. 4, the supergroup SG34 of the slice SL1 includes pixel groups in the pixel group row $PGL_{1,1}$ of the slice SL1 and pixel groups in the next pixel group row $PGL_{1,2}$ of the slice SL1. Similarly, the supergroup SG34 of the slice SL2 includes pixel groups in the pixel group row $PGL_{2,1}$ of the slice SL2 and pixel groups in the next pixel group row $PGL_{2,2}$ of the slice SL2. It should be noted that the pixel group rows $PGL_{1,1}$ and $PGL_{2,1}$ are horizontally adjacent to each other, and pixel group rows $PGL_{1,2}$ and $PGL_{2,2}$ are horizontally adjacent to each other.

Further, since the slice width is not evenly divisible by the pixel group width, the rightmost/last pixel group in each pixel group row of a slice is unable to have 3 true pixels originally included in the slice. As can be seen from FIG. 5, the pixel group G133 is the first pixel group of the supergroup SG34 in the slice SL1, and includes true pixels $P_{1,397}$, $P_{1,398}$, $P_{1,399}$ in the pixel group row $PGL_{1,1}$; and the pixel group G134 is the second pixel group of the supergroup SG34 in the slice SL1, and includes a single true pixel $P_{1,400}$ in the pixel group row $PGL_{1,1}$. Specifically, the pixel group G133 is the second-last pixel group in the pixel group row $PGL_{1,1}$, and the pixel group G134 is the last pixel group in the pixel group row $PGL_{1,1}$.

When the needed pixels are not available in the current slice SL1, the flatness determination circuit 112 is configured to borrow true pixels from a different slice, such as pixels in the horizontally adjacent pixel group line $PGL_{2,1}$ of the neighboring slice SL2. As shown in FIG. 5, the flatness determination circuit 112 treats the pixel group G134 as having 3 pixels, where one pixel $P_{1,400}$ is the rightmost/last pixel in the pixel group row $PGL_{1,1}$ of the slice SL1, and the remaining pixels $P_{2,1}$ and $P_{2,2}$ are true pixels borrowed from the pixel group row $PGL_{2,1}$ of the slice SL2. Further, more pixels $P_{2,3}$, $P_{2,4}$, $P_{2,5}$ may be borrowed from the pixel group row $PGL_{2,1}$ of the slice SL2 when the flatness determination circuit 112 perform flatness check on the last pixel group G134 in the pixel group row $PGL_{1,1}$ of the slice SL1. The pixels $P_{2,1}$-$P_{2,3}$ belong to the pixel group G1 of the supergroup SG1 in the slice SL2, and the pixels $P_{2,4}$-$P_{2,5}$ belong to the pixel group G2 of the supergroup SG1 in the slice SL2.

Figure 6:
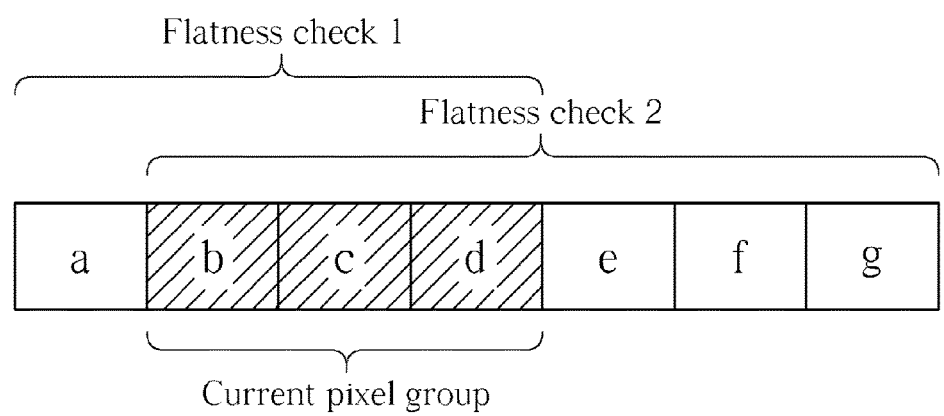
FIG. 6 is a diagram illustrating pixels used for the encoder-side flatness checks.

In accordance with VESA DSC, the flatness determination is applied to a group of pixels, and may include a first checking criterion (called flatness check 1) and a second checking criterion (called flatness check 2). FIG. 6 is a diagram illustrating pixels used for the encoder-side flatness checks. The current pixel group includes pixels b, c, d. Pixels a, b, c, d are used in the flatness check 1. Pixels b, c, d, e, f, g are used in the flatness check 2. Therefore, when the pixel group G133 shown in FIG. 5 is the current pixel group checked by the flatness determination circuit 112 and the flatness check 1 indicates that pixel group G133 is neither "somewhat flat" nor "very flat", the flatness check 2 is performed over six pixels $P_{1,397}$, $P_{1,398}$, $P_{1,399}$, $P_{1,400}$, $P_{2,1}$, $P_{2,2}$. When the pixel group G134 shown in FIG. 5 is the current pixel group checked by the flatness determination circuit 112, the flatness check 1 is performed over four pixels $P_{1,399}$, $P_{1,400}$, $P_{2,1}$, $P_{2,2}$ to determine whether at least one of "somewhat flat" check and "very flat" check can pass. When the flatness check 1 indicates that pixel group G134 is neither "somewhat flat" nor "very flat", the flatness check 2 is performed over six pixels $P_{1,400}$, $P_{2,1}$, $P_{2,2}$, $P_{2,3}$, $P_{2,4}$, $P_{2,5}$. As true pixels included in the current slice SL1 and borrowed from the neighboring slice SL2 are used to perform flatness check upon the last pixel group and the second-last pixel group in each pixel group row of the current slice SL1, the visual quality on the slice boundary can be improved due to more accurate flatness determination obtained from true pixels around the slice boundary.

The encoding circuit 114 is configured to encode all pixel groups in the first slice SL1 and all pixel groups in the second slice SL2 based on the quantization parameters set by the rate controller 115. As the image processing apparatus 100 is employed in a single-port compressed data transmission application, the output interface 104 therefore transmits the bitstream BS via one transmission port 103 of the transmission interface 101, where the bitstream BS includes at least the encoded data of the first slice SL1 and the encoded data of the second slice SL2.

In the example shown in FIG. 4 and FIG. 5, the slice width is not evenly divisible by the pixel group width (e.g., a group size of a one-dimensional group of pixels). However, the same concept of borrowing pixels from a neighboring slice to achieve better flatness check accuracy is also applicable to a case where the slice width is evenly divisible by the pixel group width.

Figure 7:
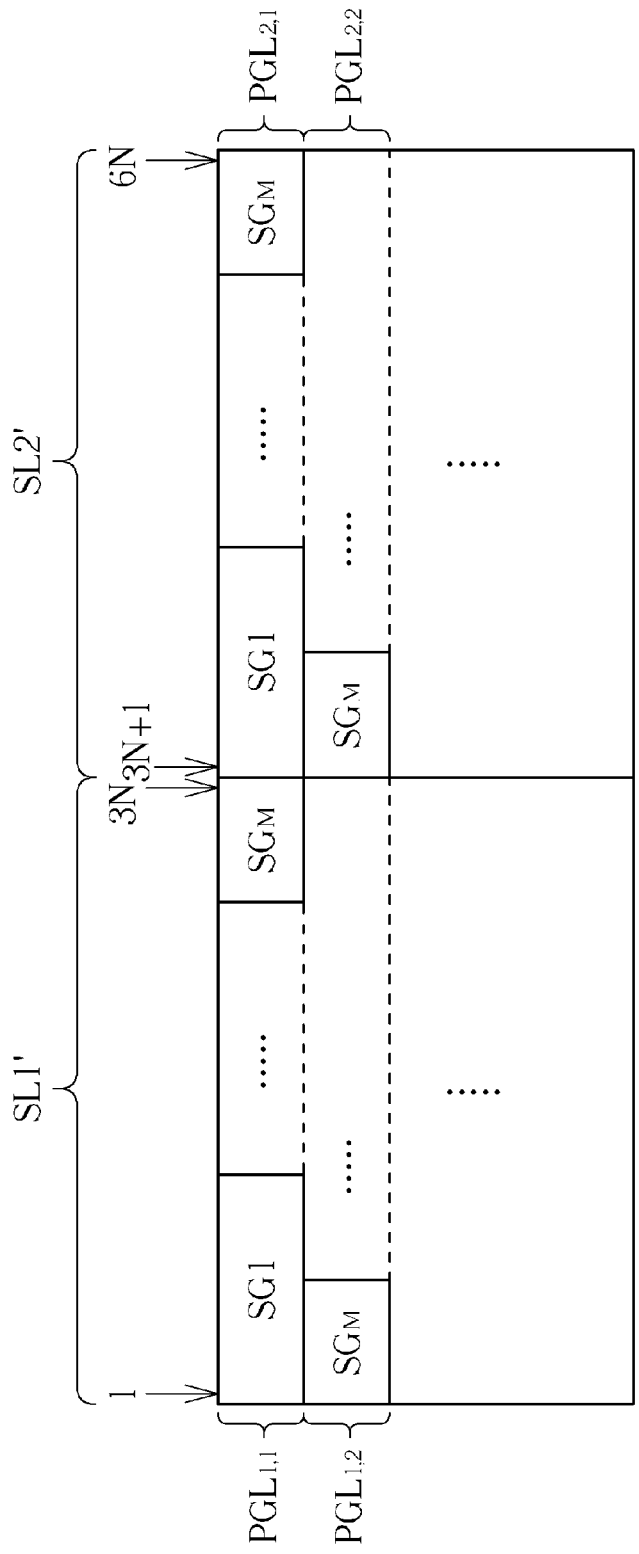
FIG. 7 is a diagram illustrating two slices each having a slice width evenly divisible by a pixel group width.
Figure 8:
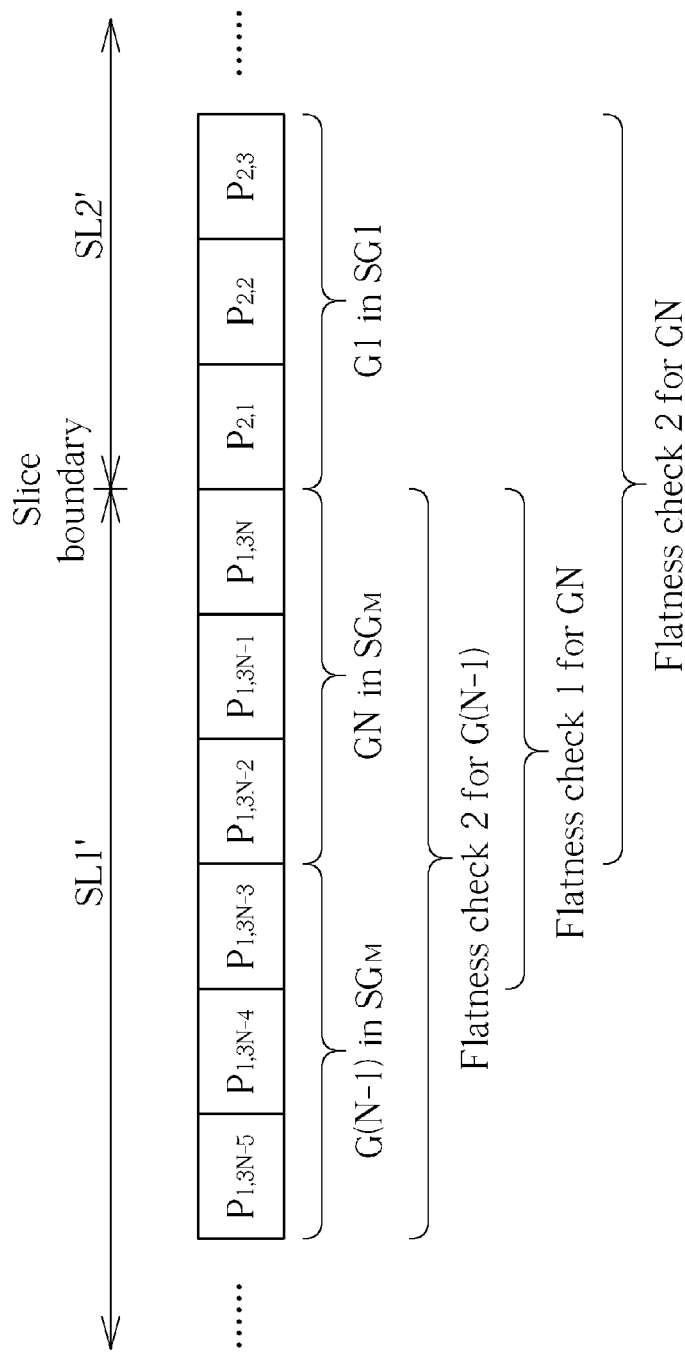
FIG. 8 is a diagram illustrating the proposed flatness check performed upon pixel groups near a slice boundary between two slices shown in FIG. 7.

Please refer to FIG. 7 in conjunction with FIG. 8. FIG. 7 is a diagram illustrating two slices each having a slice width evenly divisible by a pixel group width. FIG. 8 is a diagram illustrating the proposed flatness check performed upon pixel groups near a slice boundary between two slices shown in FIG. 7. In this embodiment, the slices determined by the partition determination circuit 111 include a first slice SL1' and a second slice SL2' horizontally adjacent to each other. In other words, the first slice SL1' and the second slice SL2' belong to the same slice row. Assume that a slice width is 3N (N is a positive integer), and a pixel group is a one-dimensional pixel group with 3 pixels (i.e., m=1 and n=3). As mentioned above, each supergroup is defined to have four pixel groups. Based on the setting of the slice width, it is still possible that a rightmost/last supergroup in a pixel group row may wrap around to include pixel groups in the next pixel group row. As can be seen from FIG. 7, the supergroup $SG_M$ of the slice SL1' includes pixel groups in the pixel group row $PGL_{1,1}$ of the slice SL1' and pixel groups in the next pixel group row $PGL_{1,2}$ of the slice SL1'. Similarly, the supergroup $SG_M$ of the slice SL2' includes pixel groups in the pixel group row $PGL_{2,1}$ of the slice SL2' and pixel groups in the next pixel group row $PGL_{2,2}$ of the slice SL2'. It should be noted that the pixel group rows $PGL_{1,1}$ and $PGL_{2,1}$ are horizontally adjacent to each other, and pixel group rows $PGL_{1,2}$ and $PGL_{2,2}$ are horizontally adjacent to each other.

Further, since the slice width is evenly divisible by the pixel group width, the rightmost/last pixel group in each pixel group row of a slice is ensured to have 3 true pixels originally included in the slice. For example, the first pixel group of the supergroup $SG_M$ in the slice SL1' may be the pixel group G(N−1) composed of pixels $P_{1,3N-5}$, $P_{1,3N-4}$, $P_{1,3N-3}$ in the pixel group row $PGL_{1,1}$ of the slice SL1, and the second pixel group of the supergroup $SG_M$ in the slice SL1' may be the pixel group GN composed of pixels $P_{1,3N-2}$, $P_{1,3N-1}$, $P_{1,3N}$ in the pixel group row $PGL_{1,1}$ of the slice SL1'. Specifically, the pixel group G(N−1) is the second-last pixel group in the pixel group row $PGL_{1,1}$, and the pixel group GN is the last pixel group in the pixel group row $PGL_{1,1}$.

When the needed pixels are not available in the current slice SL1', the flatness determination circuit 112 is configured to borrow true pixels from a different slice, such as pixels in the horizontally adjacent pixel group line $PGL_{2,1}$ of the neighboring slice SL2'. As shown in FIG. 8, pixels $P_{2,1}$, $P_{2,2}$, $P_{2,3}$ may be borrowed from the pixel group row $PGL_{2,1}$ of the slice SL2' when the flatness determination circuit 112 performs flatness check on the last pixel group GN in the pixel group row $PGL_{1,1}$ of the slice SL1'. The pixels $P_{2,1}$-$P_{2,3}$ belong to the pixel group G1 of the supergroup SG1 in the slice SL2'.

Since the pixel group GN shown in FIG. 8 has 3 pixels originally included in the first slice SL1', there is no need to use pixels borrowed from the second slice SL2' when the pixel group G(N−1) is the current pixel group checked by the flatness check 2. When the pixel group GN shown in FIG. 8 is the current pixel group checked by the flatness determination circuit 112, the flatness check 1 is performed over four pixels $P_{1,3N-3}$, $P_{1,3N-2}$, $P_{1,3N-1}$, $P_{1,3N}$ to determine whether at least one of "somewhat flat" check and "very flat" check can pass. When the flatness check 1 indicates that pixel group GN is neither "somewhat flat" nor "very flat", the flatness check 2 is performed over six pixels $P_{1,3N-2}$, $P_{1,3N-1}$, $P_{1,3N}$, $P_{2,1}$, $P_{2,2}$, $P_{2,3}$. As true pixels included in the current slice SL1' and borrowed from the neighboring slice SL2' are used to perform flatness check upon the last pixel group in each pixel group row of the current slice SL1', the same objective of offering better visual quality on the slice boundary can be achieved.

In above examples shown in FIGS. 4-5 and FIGS. 7-8, each slice row has two slices such that there is only a single slice boundary in a slice row. However, this is for illustrative purposes only, and is not meant to be a limitation of the present invention. In practice, the same concept of borrowing pixels from a neighboring slice to achieve better flatness check accuracy is also applicable to a case where each slice row has more than two slices, that is, more than one slice boundary. Consider a case where a target number of slices in one slice row is set by three. Hence, there are three slices arranged horizontally in one slice row, where one slice boundary is between a leftmost slice and a middle slice, and another slice is between the middle slice and a rightmost slice. If the aforementioned slice boundary is a slice boundary between a leftmost slice and a middle slice, the aforementioned first slice SL1/SL1' would be the leftmost slice in a slice row, and the aforementioned second slice SL2/SL2' would be the middle slice in the same slice row. If the aforementioned slice boundary is a slice boundary between a middle slice and a rightmost slice, the aforementioned first slice SL1/SL1' would be the middle slice in a slice row, and the aforementioned second slice SL2/SL2' would be the rightmost slice in the same slice row.

As mentioned above, the rate controller 115 is configured to assign a quantization parameter to each pixel group to be encoded by the encoding circuit 114. However, the adjacent slices (e.g., SL1 and SL2 shown in FIG. 4, or SL1' and SL2' shown in FIG. 7) are encoded independently. If there is no constrains on quantization parameters assigned to adjacent pixel groups on opposite sides of a slice boundary, it is possible that there may be a large discrepancy between the quantization parameters, thus resulting in degraded visual quality of the slice boundary. The present invention therefore proposes a smooth function used for mitigating or avoiding undesired visual quality degradation of the slice boundary.

Please refer to FIG. 1 again. The visual quality enhancement circuit 116 is coupled to the rate controller 115 and the encoding circuit 114, and is configured to control a first data set (e.g., a first quantization parameter, and/or pixel values of first pixels) involved in encoding a first pixel group and a second data set (e.g., a second quantization parameter, and/or pixel values of second pixels) involved in encoding a second pixel group to ensure that at least one predefined criterion is met, where the first pixel group of a first picture region and the second pixel group of a second pixel group are adjacent to each other and located on opposite sides of a boundary between the first picture region and the second picture region. In this embodiment, the first picture region and the second picture region are slices horizontally adjacent to each other (e.g., SL1 and SL2 shown in FIG. 4, or SL1' and SL2' shown in FIG. 7).

When the at least one predefined criterion is not met, the visual quality enhancement circuit 116 instructs the rate controller 115 (or the encoding circuit 114) to adjust one or both of the first data set and the second data set. Therefore, the visual quality enhancement circuit 116 can apply constrains on quantization parameters assigned to adjacent pixel groups on opposite sides of the slice boundary (or apply constrains on pixel values of pixels in adjacent pixel groups on opposite sides of the slice boundary). In this way, the visual quality of the slice boundary can be improved.

The visual quality enhancement circuit 116 may check one or more predefined criteria for restricting the data sets involved in encoding adjacent pixel groups on opposite sides of the slice boundary. For example, the at least one predefined criterion may include a first predefined criterion for examining distortion of the first pixel group and a second predefined criterion for examining distortion of the second pixel group. Hence, the visual quality enhancement circuit 116 may control the distortion of the first pixel group to be smaller than a first distortion threshold, thus meeting the first predefined criterion, and may control the distortion of the second pixel group to be smaller than a second distortion threshold, thus meeting the second predefined criterion. It should be noted that the first threshold may be different from or identical to the second threshold, depending upon the actual design consideration.

In one embodiment, the visual quality enhancement circuit 116 may control the distortion by affecting the quantization parameter. For example, if the value assigned to the quantization parameter is larger, then the distortion resulting from encoding a pixel group by using the quantization parameter is higher. Hence, properly adjusting quantization parameters used for encoding pixel groups on opposite sides of a slice boundary is capable of smoothing the distortion discrepancy between corresponding decoded pixel groups in the decoder side. In the case that the quantization parameter is not signaled or encoded in the bitstream BS, the encoder may signal the decoder with other methods. In one of the embodiments, the image processing apparatus 100 may signal flatness position and type to affect the rate control function performed in the decoder side.

In another embodiment, the visual quality enhancement circuit 116 may control the distortion by changing pixel values to be encoded. Taking FIG. 8 for example, the visual quality enhancement circuit 116 may change one or more pixel values of GN ($P_{1,3N-2}$, $P_{1,3N-1}$, $P_{1,3N}$) and/or one or more pixel values of G1 ($P_{2,1}$, $P_{2,2}$, $P_{2,3}$) such that the predefined criterion can be met.

For another example, the at least one predefined criterion may include a predefined criterion for examining a difference between distortion of the first pixel group and distortion of the second pixel group. Hence, the visual quality enhancement circuit 116 may control the difference between distortion of the first pixel group and distortion of the second pixel group to be smaller than a difference threshold, thus meeting the predefined criterion.

For yet another example, the at least one predefined criterion may include a predefined criterion for examining a difference between the first data set (e.g., first quantization parameter, and/or pixel values of first pixels to be encoded) and the second data set (e.g., second quantization parameter, and/or pixel values of second pixels to be encoded). Hence, the visual quality enhancement circuit 116 may control the difference between the first data set and the second data set to be smaller than a difference threshold, thus meeting the predefined criterion.

Further, the at least one predefined criterion may be adaptively adjusted based on at least one of a flatness check result (which may be derived from performing flatness check) and an activity check result (which may be derived from analyzing the image contents such as edges, textures, etc.). For example, the flatness check result and/or the activity check result may affect the threshold setting(s) used for judging whether the at least one predefined criterion is met.

One or both of the proposed flat check (which uses pixels borrowed from a neighboring picture region) and the proposed smooth function (which is applied to quantization parameters of pixel groups on opposite sides of a boundary of adjacent picture regions, or pixel values of pixels in pixel groups on opposite sides of a boundary of adjacent picture regions) may also be employed by an image processing apparatus in a multi-port compressed data transmission application.

Figure 9:
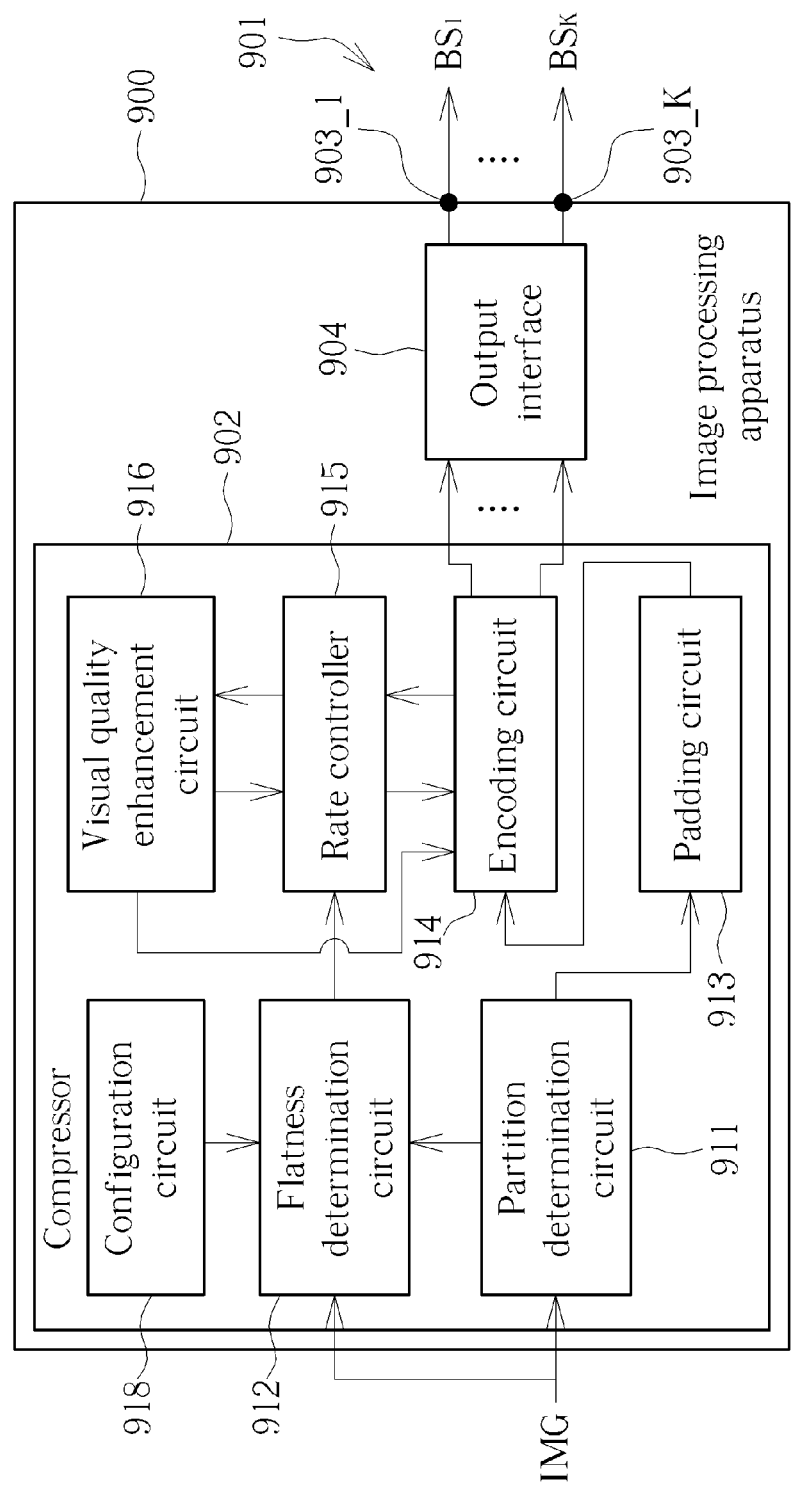
FIG. 9 is a diagram illustrating another image processing apparatus according to an embodiment of the present invention.

FIG. 9 is a diagram illustrating another image processing apparatus according to an embodiment of the present invention. The image processing apparatus 900 includes a compressor 902 and an output interface 904. The compressor 902 may include a partition determination circuit 911, a flatness determination circuit 912, a padding circuit 913, an encoding circuit 914, a rate controller 915, a visual quality enhancement circuit 916, and a configuration circuit 918. It should be noted that only the circuit components pertinent to the present invention are shown in FIG. 9. In practice, the image processing apparatus 900 may be configured to have additional circuit components.

The compressor 902 is configured to compress (i.e., encode) a picture IMG to generate a compressed picture. In this embodiment, the picture IMG is partitioned into a plurality of tiles, and the compressor 902 compresses the tiles to generate a plurality of compressed tiles. It should be noted that different naming of picture regions to be encoded for multi-port compressed data transmission may be used by different coding standards. For clarity and simplicity, the term "tile" is used hereinafter. However, this is not meant to be a limitation of the present invention. By way of example, the term "tile" and the term "pane" may be interchangeable. In this embodiment, the output interface 904 is coupled between the compressor 902 and a transmission interface 901, and configured to transit the compressed tiles (i.e., encoded data of tiles in the same picture IMG) via a plurality of transmission ports 903_1-903_K of the transmission interface 901, respectively.

Figure 10:
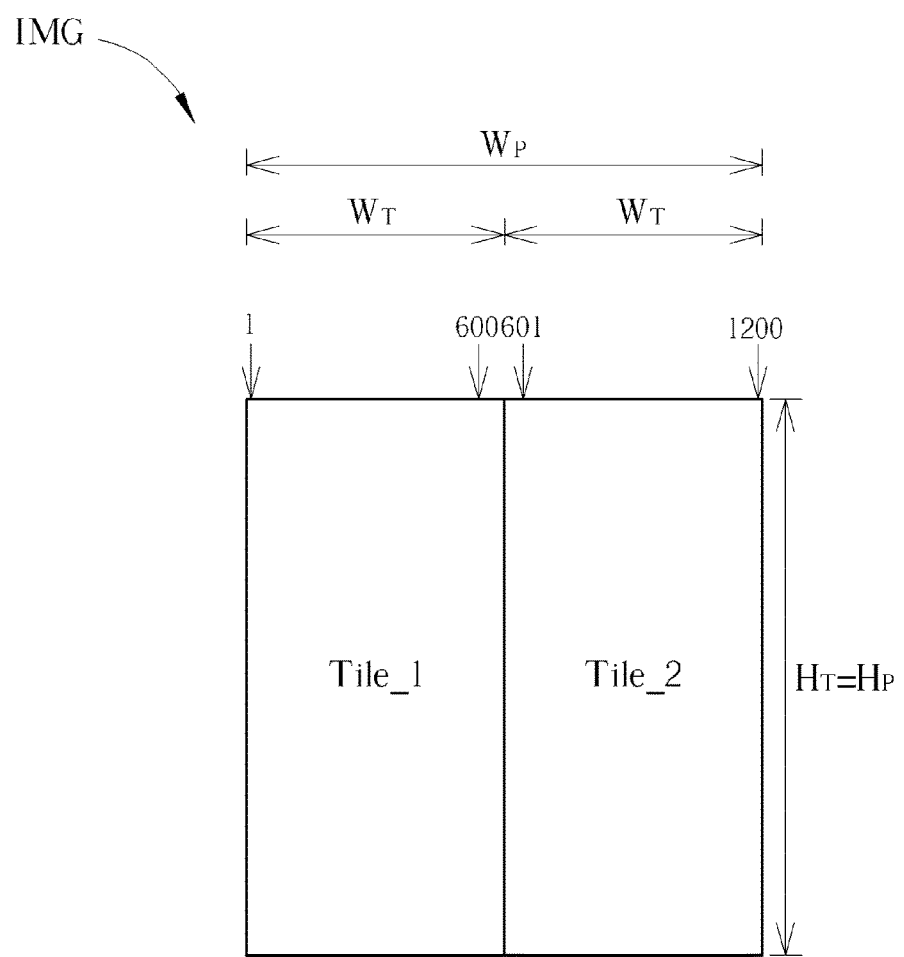
FIG. 10 is a diagram illustrating a tile-based partitioning setting of the picture according to an embodiment of the present invention.

FIG. 10 is a diagram illustrating a tile-based partitioning setting of the picture IMG according to an embodiment of the present invention. In this example, the partition determination circuit 911 may equally divide the picture IMG into two tiles Tile_1 and Tile_2. Each of the tiles Tile_1 and Tile_2 has a tile width $W_T$ and a tile height $H_T$, where the picture width $W_P$ is two times as large as the tile width $W_T$, and the picture height Hp is equal to the tile height $H_T$. Assuming that the picture width $W_P$ is 1200, the tile Tile_1 includes pixel columns 1-600, and the tile Tile_2 includes pixel columns 601-1200. The compressor 902 compresses the tile Tile_1 to generate encoded data of the tile Tile_1 to the output interface 904, and the output interface 904 outputs one bitstream (e.g., $BS_1$) to one transmission port (e.g., 903_1) according to the encoded data of the tile Tile_1. In addition, the compressor 902 compresses the tile Tile_2 to generate encoded data of the tile Tile_2 to the output interface 904, and the output interface 904 outputs another bitstream (e.g., $BS_K$) to another transmission port (e.g., 903_K) according to the encoded data of the tile Tile_2. Specifically, the image processing apparatus 900 is located in an encoder side, and generates multiple bitstreams $BS_1$-$BS_K$ to a decoder side through multiple transmission ports 903_1-903_K of the transmission interface 901, where the value of K depends on the number of tiles included in the same picture IMG.

For example, the partitioning setting determined by the partition determination circuit 911 may be referenced by the flatness determination circuit 912 for choosing correct pixels to undergo the flatness check. However, this is not meant to be a limitation of the present invention. For another example, the configuration circuit 918 is configured to store configuration information. Hence, the flatness determination circuit 912 may refer to the configuration information given by the configuration circuit 918 for choosing correct pixels to undergo the flatness check. This also falls within the scope of the present invention.

In one exemplary implementation, the image processing apparatus 900 may be implemented in a camera module, and may transmit the bitstreams $BS_1$-$BS_K$ to a plurality of ISPs, respectively. Each of the ISPs may be part of an AP. Hence, the picture IMG to be processed by the proposed image processing apparatus 900 may be derived from an output of a camera sensor in the camera module. In addition, the transmission interface 901 may be MIPI CSI, and the transmission ports 903_1-903_K may be different camera ports of the CSI.

In another exemplary implementation, the image processing apparatus 900 may be implemented in an AP, and may transmit the bitstreams $BS_1$-$BS_K$ to a plurality of DDICs, respectively. Hence, the picture IMG to be processed by the proposed image processing apparatus 900 may be generated in the AP. In addition, the transmission interface 901 may be MIPI DSI, and the transmission ports 903_1-903_K may be different display ports of the DSI.

As shown in FIG. 9, the image processing apparatus 900 is configured to use a single encoder (i.e., one compressor 902) for encoding multiple tiles of the picture IMG in a sequential manner. However, this is not meant to be a limitation of the present invention. In an alternative design, the image processing apparatus 900 may be configured to have a plurality of encoders (i.e., a plurality of compressors, each implemented using the compressor 902) for encoding multiple tiles of the picture IMG in a parallel manner.

The functions and operations of circuit components in the compressor 902 shown in FIG. 9 are similar to that of circuit components in the compressor 102 shown in FIG. 1. The major difference is that the compressor 102 employs the proposed flatness check and/or the proposed smooth function to improve the visual quality of the slice boundary, while the compressor 902 employs the proposed flatness check and/or the proposed smooth function to improve the visual quality of the tile boundary.

Each of the partition determination circuits 111 and 911 is configured to partition a picture into a plurality of picture regions. With regard to the partition determination circuit 111, each of the picture regions is a slice. With regard to the partition determination circuit 911, each of the picture regions is a tile.

Each of the flatness determination circuits 112 and 912 is configured to perform flatness check upon a specific pixel group in a pixel group row of a first picture region through using at least one pixel borrowed from a second picture region. With regard to the flatness determination circuit 112, the first picture region and the second picture region are slices horizontally adjacent to each other. With regard to the flatness determination circuit 912, the first picture region and the second picture region are tiles horizontally adjacent to each other. By way of example, but not limitation, each of the tiles Tile_1 and Tile_2 shown in FIG. 10 may have a single slice only. Hence, the slices SL1 and SL2 shown in FIG. 4 may be viewed as the tiles Tile_1 and Tile_2, and the slices SL1' and SL2' shown in FIG. 7 may be viewed as the tiles Tile_1 and Tile_2. Hence, the same flatness check technique applied to the slices SL1 and SL2 for improving visual quality of a slice boundary between the slices SL1 and SL2 each having the slice width $W_S$ not evenly divisible by a pixel group width (e.g., a group size of a one-dimensional group of pixels) may also be applied to the tiles Tile_1 and Tile_2 for improving visual quality of a tile boundary between the tiles Tile_1 and Tile_2 each having the tile width $W_T$ not evenly divisible by a pixel group width (e.g., a group size of a one-dimensional group of pixels); and the same flatness check technique applied to the slices SL1' and SL2' for improving visual quality of a slice boundary between the slices SL1' and SL2' each having the slice width $W_S$ evenly divisible by a pixel group width (e.g., a group size of a one-dimensional group of pixels) may also be applied to the tiles Tile_1 and Tile_2 for improving visual quality of a tile boundary between the tiles Tile_1 and Tile_2 each having the tile width $W_T$ evenly divisible by a pixel group width (e.g., a group size of a one-dimensional group of pixels).

Each of the visual quality enhancement circuits 116 and 916 is configured to control a first data set (e.g., a first quantization parameter, and/or pixel values of first pixels) involved in encoding a first pixel group and a second data set (e.g., a second quantization parameter, and/or pixel values of second pixels) involved in encoding a second pixel group to ensure that at least one predefined criterion is met, where the first pixel group of a first picture region and the second pixel group of a second pixel group are adjacent to each other and located on opposite sides of a boundary between the first picture region and the second picture region. With regard to the visual quality enhancement circuit 116, the first picture region and the second picture region are slices horizontally adjacent to each other (e.g., SL1 and SL2 shown in FIG. 4, or SL1' and SL2' shown in FIG. 7). With regard to the visual quality enhancement circuit 916, the first picture region and the second picture region are tiles horizontally adjacent to each other (e.g., Tile_1 and Tile_2 shown in FIG. 10). The same smooth function applied to quantization parameters assigned to pixel groups on opposite side of a slice boundary may also be applied to quantization parameters assigned to pixel groups on opposite side of a tile boundary. Further, the same smooth function applied to pixel values of pixels in pixel groups on opposite side of a slice boundary may also be applied to pixel values of pixels in pixel groups on opposite side of a tile boundary.

As a person skilled in the art can readily understand details of the flat check (which uses pixels borrowed from a neighboring tile) and the smooth function (which is applied to quantization parameters of pixel groups on opposite sides of a tile boundary, or pixel values of pixels in pixel groups on opposite sides of a tile boundary) after reading above paragraphs directed to the flat check (which uses pixels borrowed from a neighboring slice) and the smooth function (which is applied to quantization parameters of pixel groups on opposite sides of a slice boundary, or pixel values of pixels in pixel groups on opposite sides of a slice boundary), further description is omitted here for brevity.

Like the padding circuit 113, the padding circuit 913 is configured to add padding pixels needed for encoding a pixel group. The rate controller 915 is configured to apply bit rate control to each compression operation performed by the encoding circuit 914. For example, the rate controller 915 determines a bit budget of each slice in a tile, and assigns a quantization parameter to each pixel group to be encoded. Like the rate controller 115, the rate controller 915 may adjust the quantization parameters based on the flatness determination result and/or may be instructed by the visual quality enhancement circuit 916 to have constraints on the quantization parameters. The encoding circuit 914 is configured to encode tiles in the picture IMG (e.g., Tile_1 and Tile_2 shown in FIG. 10), and generate encoded tiles (e.g., encoded data of Tile_1 and Tile_2) to the output interface 904. Next, the output interface 904 transmits bitstreams via different transmission ports of the same transmission interface. For example, a first bitstream transmitted via a first transmission port includes at least the encoded data of the tile Tile_1, and a second bitstream transmitted via a second transmission port includes at least the encoded data of the tile Tile_2.

Figure 11:
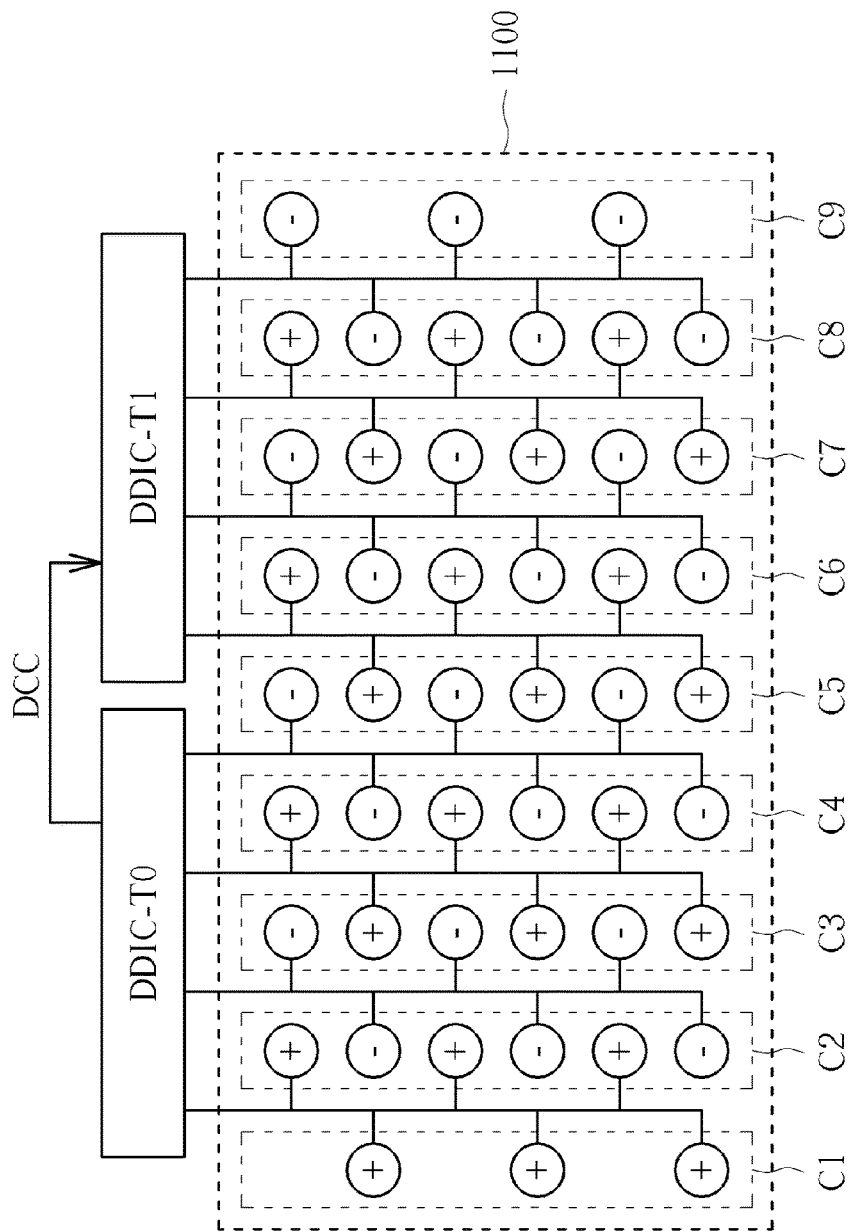
FIG. 11 is a diagram illustrating a display screen with overlapped display areas driven by multiple display driver integrated circuits according to an embodiment of the present invention.

As mentioned above, when the image processing apparatus 900 is implemented in an AP, the image processing apparatus 900 generates bitstreams $BS_1$-$BS_K$ to a plurality of DDICs through display ports of a display interface (e.g., MIPI DSI). The DDICs are used to drive different display areas of a display screen. Hence, each of the DDICs has a decompressor and a display driver, where the decompressor is used for decompressing an encoded tile transmitted via one of the bitstreams $BS_1$-$BS_K$ to generate a reconstructed tile, and the display driver is used to drive a designated display area according to pixel data of the reconstructed tile. In a case where the display areas driven by the DDICs are non-overlapped areas of the display screen, the picture IMG may be divided into non-overlapped tiles, such as the tiles Tile_1 and Tile_2 shown in FIG. 10. However, when the DDICs are required to drive overlapped display areas of a display screen, the partition determination circuit 911 has to consider an overlapped region of two adjacent tiles. FIG. 11 is a diagram illustrating a display screen with overlapped display areas driven by multiple DDICs according to an embodiment of the present invention. In this example, the display screen 110 has a plurality of pixel columns C1-C9. As can be seen from FIG. 11, each of the pixel columns C1-C4 is fully driven by a first DDIC (denoted as DDIC-T0), and each of the pixel columns C6-C9 is fully driven by a second DDIC (denoted as DDIC-T1). However, the pixel column C5 is partially driven by DDIC-T0 and partially driven by DDIC-T1. Hence, both DDIC-T0 and DDIC-T1 need to receive pixel data of the overlapped pixel column C5. It should be noted that different display screens may have different overlapped region configurations, such as different overlapped region sizes, different overlapped region shapes, different overlapped region patterns, etc. Furthermore, a data communication channel (DCC) may be used to transfer data between DDICs. For example, pixel data of an overlapped region may be directly transferred from DDIC-T0 to DDIC-T1. For another example, DDIC-T0 may apply certain image processing to pixel data of an overlapped region, and then transfer processed pixel data of the overlapped region to DDIC-T1.

Figure 12:
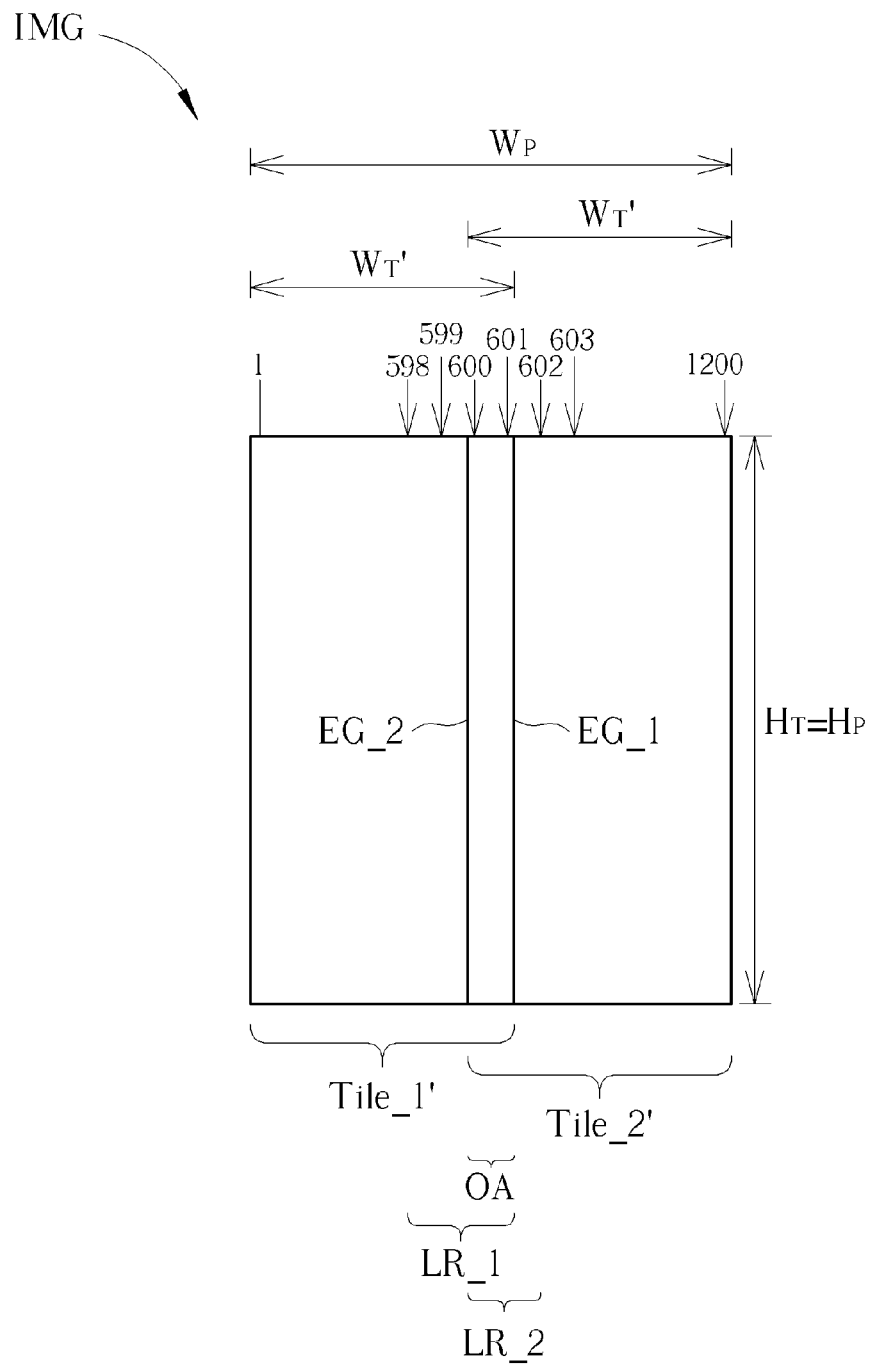
FIG. 12 is a diagram illustrating another tile-based partitioning setting of the picture according to an embodiment of the present invention.

FIG. 12 is a diagram illustrating another tile-based partitioning setting of the picture IMG according to an embodiment of the present invention. Based on the driving requirement of the display screen, the partition determination circuit 911 is further configured to partition the picture IMG into overlapped tiles to cover any overlapped region(s). In this example, the partition determination circuit 911 may equally divide the picture IMG into two overlapped tiles Tile_1' and Tile_2'. Each of the overlapped tiles Tile_1' and Tile_2' has the same tile width $W_T'$. Assuming that the picture width $W_P$ is 1200, the tile width $W_T'$ may be set by 601. Hence, the overlapped tile Tile_1' includes pixel columns 1-601, and the overlapped tile Tile_2' includes pixel columns 600-1200. As shown in FIG. 12, the overlapped tile Tile_1' has a right edge EG_1, and the overlapped tile Tile_2' has a left edge EG_2. The right edge EG_1 and the left edge EG_2 would define an overlapped region OA, including pixel columns 600 and 601. The encoded data of the overlapped tile Tile_1' may be transmitted to one DDIC (e.g., DDIC-T0 in FIG. 11), and the encoded data of the overlapped tile Tile_2' may be transmitted to another DDIC (e.g., DDIC-T1 in FIG. 11).

The present invention further proposes identifying limitations regions from the tiles. In a limitation region, the functionality of compression is limited. In addition, different coding tools and/or different compression specifications may have different limitation regions. For example, a limitation region used by the P-mode coding may be different from a limitation region used by the ICH coding. A limitation region may include an overlapped region of a tile and a partial non-overlapped region of the tile. For example, the limitation region LR_1 identified from the overlapped tile Tile_1' may include pixel columns 598-601, and the limitation region LR_2 identified from the overlapped tile Tile_2' may include pixel columns 600-602.

As shown in FIG. 12, the picture IMG is equally divided into overlapped tiles Tile_1' and Tile_2' having the same tile width $W_T'$. The width $W_T'$ depends on the picture width $W_P$, and is not ensured to be an integer multiple of a pixel group width. In an alternative design, the partition determination circuit 911 may be configured to set each tile width as an integer multiple of a pixel group width. Assume that each pixel group is a one-dimensional pixel group having 3 pixels. Therefore, the pixel group width would be 3. In a case where a symmetric partitioning style is used, the tile width $W_T'$ (which is obtained by dividing the picture IMG into equal-sized overlapped tiles) may be extended to a value that is an integer multiple of the pixel group width, thus extending the overlapped region OA correspondingly. In addition, the original left edge (i.e., pixel column 1) of the overlapped tile Tile_1' is kept unchanged, and the original right edge (i.e., pixel column 1200) of the overlapped tile Tile_2' is kept unchanged. For example, when the tile width $W_T'$ is extended to 603, the overlapped tile Tile_1' would include pixel columns 1-603, and the overlapped tile Tile_2' would include pixel columns 598-1200.

In a case where another symmetric partitioning style is used, the tile width $W_T'$ (which is obtained by dividing the picture IMG into equal-sized overlapped tiles) may be extended to a value that is an integer multiple of the pixel group width, where the original left edge (i.e., pixel column 1) of the overlapped tile Tile_1' is kept unchanged, and the original left edge (i.e., pixel column 600) of the overlapped tile Tile_2' is kept unchanged. For example, when the tile width $W_T'$ is extended to 603, the overlapped tile Tile_1' would include pixel columns 1-603, and the overlapped tile Tile_2' would include pixel columns 600-1202, where each of the pixel columns 1201 and 1202 is a padding pixel column each generated by replicating the rightmost/last pixel column 1200 of the picture IMG.

In a case where an asymmetric partitioning style, the picture IMG may be divided into non-overlapped tiles having different tile widths, where each of the tile widths is an integer multiple of the pixel group width. The pixel data of the overlapped region is decoded by one DDIC (e.g., DDIC-T0 in FIG. 11), and then transferred to another DDIC (e.g., DDIC-T1 in FIG. 11) through DCC. For example, when one tile width $W_T'$ (which is obtained by dividing the picture IMG into equal-sized overlapped tiles) is extended to 603 and the other tile width $W_T'$ (which is obtained by dividing the picture IMG into equal-sized overlapped tiles) is shrunk to 597, the overlapped tile Tile_1' is changed to a non-overlapped tile including pixel columns 1-603, and the overlapped tile Tile_2' is changed to a non-overlapped tile including pixel columns 604-1200. Since the required pixel data of the overlapped region is given from DDIC-T0 to DDIC-T1 through DCC, the same objective of using DDICs to drive overlapped display areas of a display screen is achieved.

As mentioned above, multiple encoders (e.g., compressors 902) may be used to encode/compress tiles in a parallel manner. When adjacent tiles are processed by different encoders, the image processing apparatus should take care of the proposed flatness check and the proposed smooth function to ensure normal operations on the slice boundary/tile boundary.

Figure 13:
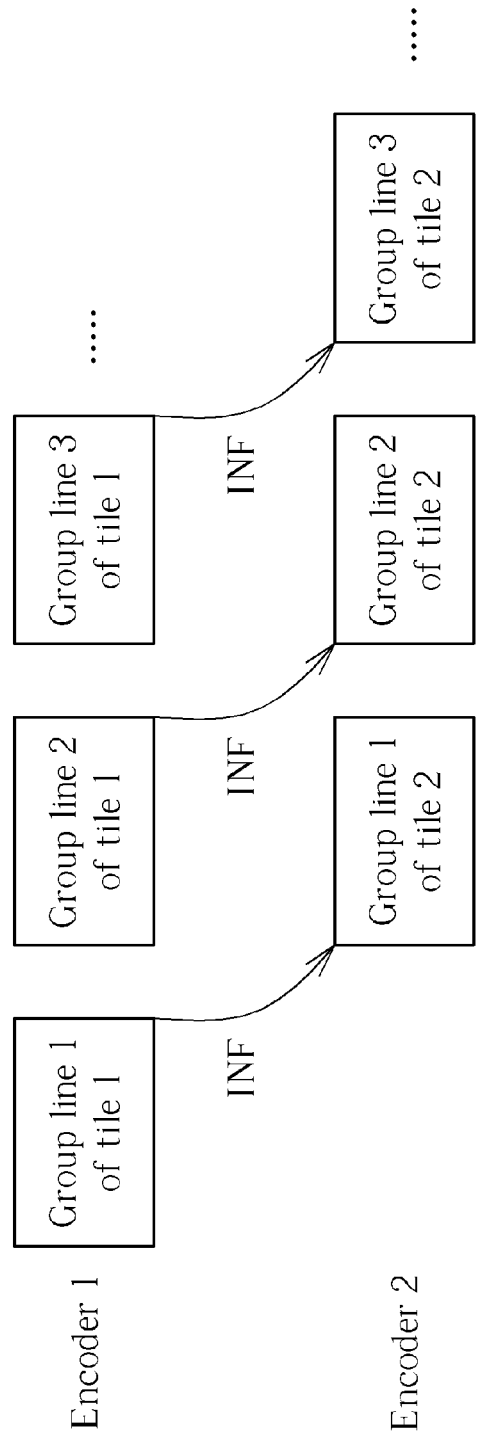
FIG. 13 is a diagram illustrating a first operational scenario of using multiple encoders to encode multiple tiles.

FIG. 13 is a diagram illustrating a first operational scenario of using multiple encoders to encode multiple tiles. In this example, the encoder 1 is used to encode tile 1, and the encoder 2 is used to encode tile 2. The pixel data of tile 1 and tile 2 may be retrieved directly from a buffer. Concerning horizontally adjacent group lines (i.e., pixel group rows) belong to tile 1 and tile 2 respectively, the encoder 1 operates first, and the encoder 2 can be triggered around the time when the tile boundary information INF of tile 1 is available for the encoder 2. The tile boundary information INF of tile 1 may include a flatness check result, an activity check result, QP information, pixels, distortion threshold, information needed for smooth function, etc.

Figure 14:
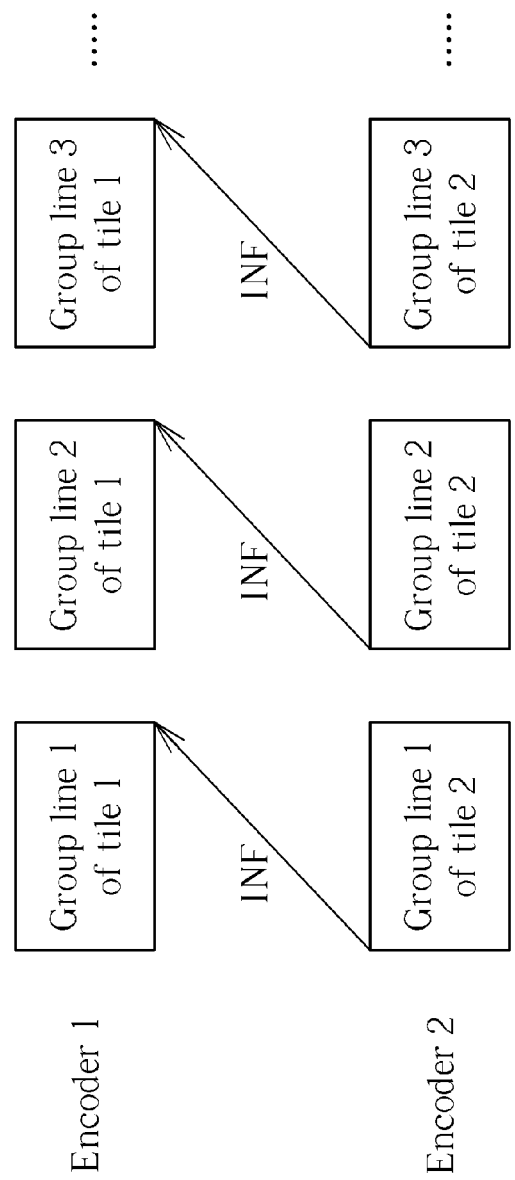
FIG. 14 is a diagram illustrating a second operational scenario of using multiple encoders to encode multiple tiles.

FIG. 14 is a diagram illustrating a second operational scenario of using multiple encoders to encode multiple tiles. In this example, the encoder 1 is used to encode tile 1, and the encoder 2 is used to encode tile 2. The pixel data of tile 1 and tile 2 may be retrieved directly from a buffer. Concerning horizontally adjacent group lines (i.e., pixel group rows) belong to tile 1 and tile 2 respectively, the encoder 1 and the encoder 2 operate around the same time. Tile boundary processing may be performed at the beginning of each group line (i.e., pixel group row). Further, when processing the last pixel group/supergroup of a group line of tile 1, the encoder 1 may refer to tile boundary information INF given from the encoder 2. For example, the tile boundary information INF of tile2 may include a flatness check result, an activity check result, QP information, pixels, distortion threshold, information needed for smooth function, etc.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. An image processing method, comprising:
   partitioning a picture into a plurality of picture regions, wherein the picture is not processed by an encoding operation yet, the encoding operation comprises quantization, each picture region comprises at least one pixel group row, each pixel group row comprises at least one pixel group, and the picture regions comprise a first picture region and a second picture region horizontally adjacent to each other;
   performing flatness check upon a specific pixel group in a pixel group row of the first picture region through using at least one pixel borrowed from the second picture region, wherein the specific pixel group checked by the flatness check is not yet processed by the encoding operation that comprises the quantization; and a result of the flatness check is referenced to selectively adjust a quantization parameter employed by the quantization; and
   performing, by an encoding circuit, the encoding operation upon the picture to generate a compressed picture.

2. The image processing method of claim 1, further comprising:
   encoding the first picture region;
   encoding the second picture region;
   transmitting a bitstream via a transmission port of a transmission interface, wherein the bitstream includes at least encoded data of the first picture region and encoded data of the second picture region.

3. The image processing method of claim 1, further comprising:
   encoding the first picture region;
   encoding the second picture region;
   transmitting a first bitstream via a first transmission port of a transmission interface, wherein the first bitstream includes at least encoded data of the first picture region; and
   transmitting a second bitstream via a second transmission port of the transmission interface, wherein the second transmission port is different from the first transmission port, and the second bitstream includes at least encoded data of the second picture region.

4. The image processing method of claim 1, wherein the specific pixel group is a second-last pixel group of the pixel group row.

5. The image processing method of claim 1, wherein the specific pixel group is a last pixel group of the pixel group row.

6. The image processing method of claim 1, wherein the at least one pixel is borrowed from a pixel group row in the second picture region that is horizontally adjacent to the pixel group row of the first picture region.

7. An image processing method, comprising:
partitioning a picture into a plurality of picture regions, wherein the picture is not processed by an encoding operation yet, the encoding operation comprises quantization, each picture region comprises at least one pixel group row, and each pixel group row comprises at least one pixel group;
performing flatness check upon a last pixel group in a pixel group row of a picture region through using at least one first pixel beyond a right edge of the pixel group row, wherein the last pixel group checked by the flatness check is not yet processed by the encoding operation that comprises the quantization; and a result of the flatness check is referenced to selectively adjust a quantization parameter employed by the quantization; and
encoding the last pixel group in the pixel group row of the picture region through using at least one second pixel beyond the right edge of the pixel group row;
wherein the right edge of the pixel group row is not a right edge of the picture, and a source of the at least one first pixel is different from a source of the at least one second pixel.

8. The image processing method of claim 7, wherein the source of the at least one first pixel is another picture region.

9. The image processing method of claim 8, wherein the another picture region is horizontally adjacent to the picture region.

10. The image processing method of claim 7, wherein the source of the at least one second pixel is the last pixel group of the picture region.

11. An image processing method, comprising:
partitioning a picture into a plurality of picture regions, wherein the picture is not processed by an encoding operation yet, the encoding operation comprises quantization, each picture region comprises a plurality of pixel groups, the picture regions comprise a first picture region and a second picture region, and a first pixel group of the first picture region and a second pixel group of the second picture region are adjacent to each other and located on opposite sides of a boundary between the first picture region and the second picture region; and
controlling a first data set involved in encoding the first pixel group and a second data set involved in encoding the second pixel group to ensure that at least one predefined criterion is met, wherein before the first data set is used by the encoding operation to encode the first pixel group, the first pixel group is not yet processed by the encoding operation that comprises the quantization; before the second data set is used by the encoding operation to encode the second pixel group, the second pixel group is not yet processed by the encoding operation that comprises the quantization; the first data set and the second data set comprise quantization parameters employed by the quantization, or comprise pixel values of pixels included in the picture to be encoded.

12. The image processing method of claim 11, wherein the first picture region and the second picture region are horizontally adjacent to each other.

13. The image processing method of claim 11, further comprising:
encoding the first picture region;
encoding the second picture region;
transmitting a bitstream via a transmission port of a transmission interface, wherein the bitstream includes at least encoded data of the first picture region and encoded data of the second picture region.

14. The image processing method of claim 11, further comprising:
encoding the first picture region;
encoding the second picture region;
transmitting a first bitstream via a first transmission port of a transmission interface, wherein the first bitstream includes at least encoded data of the first picture region; and
transmitting a second bitstream via a second transmission port of the transmission interface, wherein the second transmission port is different from the first transmission port, and the second bitstream includes at least encoded data of the second picture region.

15. The image processing method of claim 11, wherein the at least one predefined criterion includes a first predefined criterion for examining distortion of the first pixel group and a second predefined criterion for examining distortion of the second pixel group.

16. The image processing method of claim 11, wherein the at least one predefined criterion includes a predefined criterion for examining a difference between distortion of the first pixel group and distortion of the second pixel group.

17. The image processing method of claim 11, wherein the at least one predefined criterion includes a predefined criterion for examining a difference between the first data set and the second data set.

18. The image processing method of claim 11, further comprising:
determining the at least one predefined criterion according to at least one of a flatness check result and an activity check result.

19. An image processing apparatus, comprising:
a partition determination circuit, configured to partition a picture into a plurality of picture regions, wherein the picture is not processed by an encoding operation yet, the encoding operation comprises quantization, each picture region comprises at least one pixel group row, each pixel group row comprises at least one pixel group, and the picture regions comprise a first picture region and a second picture region horizontally adjacent to each other;
a flatness determination circuit, configured to perform flatness check upon a specific pixel group in a pixel group row of the first picture region through using at least one pixel borrowed from the second picture region, wherein the specific pixel group checked by the flatness check is not yet processed by the encoding operation that comprises the quantization; and a result of the flatness check is referenced by a rate controller to selectively adjust a quantization parameter employed by the quantization; and
an encoding circuit, configured to perform the encoding operation upon the picture to generate a compressed picture.

20. An image processing apparatus, comprising:
a partition determination circuit, configured to partition a picture into a plurality of picture regions, wherein the picture is not processed by an encoding operation yet, the encoding operation comprises quantization, each picture region comprises at least one pixel group row, and each pixel group row comprises at least one pixel group;
a flatness determination circuit, configured to perform flatness check upon a last pixel group in a pixel group row of a picture region through using at least one first pixel beyond a right edge of the pixel group row, wherein the last pixel group checked by the flatness check is not yet processed by the encoding operation that comprises the quantization; and a result of the flatness check is referenced by a rate controller to selectively adjust a quantization parameter employed by the quantization; and an encoding circuit, configured to encode the last pixel group in the pixel group row of the picture region through using at least one second pixel beyond the right edge of the pixel group row;

wherein the right edge of the pixel group row is not a right edge of the picture, and a source of the at least one first pixel is different from a source of the at least one second pixel.

21. An image processing apparatus, comprising:

a partition determination circuit, configured to partition a picture into a plurality of picture regions, wherein the picture is not processed by an encoding operation yet, the encoding operation comprises quantization, each picture region comprises a plurality of pixel groups, the picture regions comprise a first picture region and a second picture region, and a first pixel group of the first picture region and a second pixel group of the second picture region are adjacent to each other and located on opposite sides of a boundary between the first picture region and the second picture region; and a visual quality enhancement circuit, configured to control a first data set involved in encoding the first pixel group and a second data set involved in encoding the second pixel group to ensure that at least one predefined criterion is met, wherein before the first data set is used by the encoding operation to encode the first pixel group, the first pixel group is not yet processed by the encoding operation that comprises the quantization; before the second data set is used by the encoding operation to encode the second pixel group, the second pixel group is not yet processed by the encoding operation that comprises the quantization; the first data set and the second data set comprise quantization parameters employed by the quantization, or comprise pixel values of pixels included in the picture to be encoded.

* * * * *